United States Patent [19]

Louzil

[11] 4,022,322

[45] May 10, 1977

[54] CONTAINER FOR A RECORD CARRIER

[75] Inventor: Friedrich Louzil, Vienna, Austria

[73] Assignee: U.S. Philips Corporation, New York, N.Y.

[22] Filed: Sept. 30, 1975

[21] Appl. No.: 618,218

[30] Foreign Application Priority Data

Oct. 2, 1974 Austria .............................. 7925/74

[52] U.S. Cl. .............................. 206/387; 206/459; 206/309; 40/340
[51] Int. Cl.² ................. B65D 85/672; B65D 85/30
[58] Field of Search ................... 206/459, 309–313, 206/387; 40/340, 124.1, 359

[56] References Cited

UNITED STATES PATENTS

| | | | |
|---|---|---|---|
| 3,272,325 | 9/1966 | Schoenmakers | 206/387 |
| 3,677,396 | 7/1972 | Staar | 206/387 |

Primary Examiner—George E. Lowrance
Assistant Examiner—Douglas B. Farrow
Attorney, Agent, or Firm—Frank R. Trifari; David R. Treacy

[57] ABSTRACT

A container with a receptacle for a record carrier such as a tape cassette is provided with at least one clamping device which is disposed on a wall of the container, by means of which device a graphic carrier, such as a letter, an index strip, a note etc. can be clamped in position in the container. The clamping device comprises a lug which projects into the receptacle for actuation of the device.

2 Claims, 3 Drawing Figures

CONTAINER FOR A RECORD CARRIER

The invention relates to a container with a receptable for a record carrier which is preferably accommodated in a cassette, and at least one compartment into which a graphic carrier, such as a letter, an index strip, a note or the like can be inserted, and more particularly to a container comprising and at least one clamping device which is disposed on a wall of the container, by means of which device a graphic carrier inserted in the compartment can be clamped in position. Such a container serves for storing or mailing the record carrier or cassette, hereinafter referred to as a record carrier assembly, in its storage compartment, which carrier may for example take the form of a disk, foil or tape, and which may contain information which is for example magnetically or optically stored. By means of the clamping device of the container a graphic carrier inserted in the compartment thereof, which carrier contains information associated with the record carrier assembly inserted in the receptacle, can then be affixed to the container, so that the record carrier assembly and the graphic carrier are jointly available for further processing. The graphic carrier may then be fixed to the container directly as such or accommodated in a protection device, for example a file, an envelope, a sleeve or the like.

It is the object of the invention to enable the graphic carrier to be inserted into the compartment of such a container in a particularly simple and unimpeded manner and to ensure that it is retained by the clamping device in a particularly reliable manner. For this purpose a container according to the invention, of the type mentioned in the preamble, is characterized in that the clamping device is arranged on a wall of the container which is disposed between the receptacle for a cassette and the compartment for a graphic carrier, and comprises a lug which projects into the receptacle, which lug serves to actuate the device. Thus it is achieved that the graphic carrier, as long as the container does not yet contain a record carrier, can be inserted very easily into the compartment of the container, because the clamping device only exerts a force on the graphic carrier assembly when a record carrier is inserted into the container.

In a particularly simple and compact embodiment is obtained, when the wall of the container which is disposed between the receptacle for the assembly and the compartment for a graphic carrier, comprises a cut-out, in which the clamping device is disposed to be pivotable about a hinge extending in the plane of the wall.

The invention will now be described in more detail with reference to some embodiments shown in the drawing, but to which embodiments it is not limited.

Figure 1:
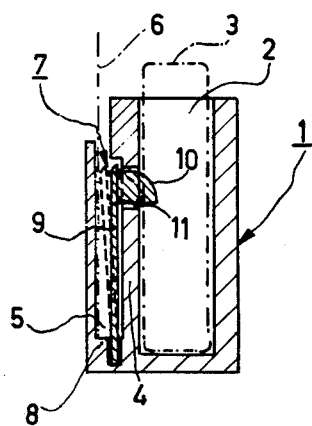
FIG. 1 is a sectional view of a container with a clampling device which can be actuated when a cassette is inserted into the container.

FIG. 1 shows a container 1 with a receptacle 2 which is open at one side, in which receptacle a cassette 3, represented by dash-dot lines, which cassette contains a record carrier, not shown, for example in the form of a disk, foil or tape, can be inserted for storage or mailing. It is obvious that it is also possible to accommodate a record carrier which is simply wound onto a reel in the receptacle 2. At its outer surface adjacent to a wall 4 the container 1 comprises a compartment 5 into which a graphic carrier 6, also represented by dash-dot lines, can be inserted, which carrier is associated with the record carrier accommodated in the cassette 3. In this respect a graphic carrier is to be understood to mean for example a letter, a note with instructions, an index strip provided with marks by a marking device of a recording and/or playback apparatus, and the like.

On the wall of the container 1, in addition to the receptacle 2, a clamping device 7 is provided by means of which a graphic carrier 6 inserted in the compartment 5 can be affixed to the container 1. The clamping device 7 consists of a plate-shaped elastically pivotable clamping member 9 which is fixed at the bottom of the compartment 5, which member comprises an extending lug 10 which, for actuation of the clamping device upon insertion of a cassette 3 into the receptacle 2, projects into the receptacle 2 through an opening 11 in the wall 4.

In order to accommodate a graphic carrier 6 and a cassette 3 in said container, the graphic carrier 6 should first be inserted into the compartment 5 and subsequently the cassette 3 should be inserted into the receptacle 2. During insertion of the cassette 3 into the receptacle 2, the cassette abuts against the lug 10 of the clamping device 7, so that the lug 10 is forced out of the receptacle 2 and the clamping member 9 is positioned so that it clamps the graphic carrier 6 inserted in the compartment 5 in position. The lug 10 then at the same time retains the cassette 3 in the receptacle 2.

In this way a cassette inserted in the container and a graphic carrier associated with said cassette and inserted into the container as described, are retained in the container for further joint processing. The container of FIG. 1 has the advantage that the graphic carrier, which is often mechanically vulnerable, can readily be affixed to the container without the risk of deformation.

Figure 2:
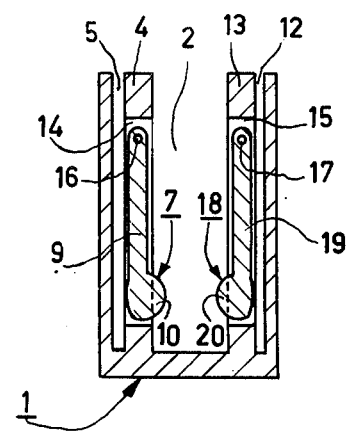
FIG. 2 shows a container which is adapted to accommodate one cassette and two graphic carriers, which comprises two clamping devices which are each pivotable about a spindle in a wall of the container.

FIG. 2 in analogy to the embodiment of FIG. 1 shows a container 1 with a receptacle 2 for a cassette, but in this case with two compartments 5 and 12 for accommodating a graphic carrier each. In the walls 4 and 13 which are disposed between the receptacle 2 and the compartments 5 and 12 respectively a cut-out 14 and 15 respectively is provided, in which a clamping device 7 or 8 is mounted, which device is pivotable about a hinge 16 or 17 which extends in the plane of the wall 4 and 13 respectively. Each clamping device 7 or 8 then consists of a clamping member 9 or 19 and an extending lug portion 10 or 20 respectively, which is fixed to the clamping member and which projects into the receptacle 2, which lugs again serve for actuation of the clamping devices upon insertion of a cassette into the receptacle 2. By accommodating the clamping devices in the cut-outs 14 and 15 of the walls 4 and 13 respectively, a very compact arrangement is obtained.

Two graphic carriers inserted in the compartments 5 and 12, each graphic carrier for example corresponding to a track of a magnetisable record carrier in the form of a dual-track tape which is accommodated in a cassette, are clamped in position by the insertion of the cassette into the container in a similar way, as described hereinbefore with reference to FIG. 1. If desired, the container may be provided with a cover for closing the receptacle and the compartments, so that graphic carriers inserted in the compartments, as well as a record carrier accommodate in the receptacle are protected against damage, soiling etc., which is of special importance if the container is intended for long-term storage purposes.

Figure 3:
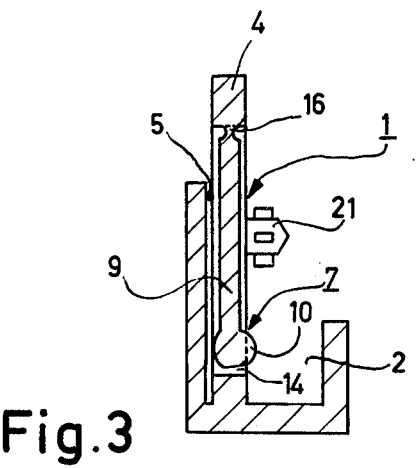
FIG. 3 shows a container in which the clamping device, in a cut-out in the container wall, is connected to the wall through a hinge.

The container 1 shown in FIG. 3 is provided with a partly open receptacle 2, which serves for accommodating a cassette, which cassette accommodates two adjacent windings hubs, which each have an opening which is accessible from the outside of the cassette, between which a record carrier in the form of a tape extends. To lock the two winding hubs in the cassette whilst the cassette is disposed in the container, two mandrels 21 are provided on the wall 4 of the container in known manner, which project into the receptacle 2 for engagement with the openings of the winding hubs. Further, said container is of similar construction as the container shown in FIG. 2, the clamping device 7 being again pivotably disposed in a cut-out 14 of the wall 4 between the receptacle 2 for a cassette and the compartment 5 for a graphic carrier.

However, in this case the container 1 and the clamping device 7 are manufactured integrally, the hinge 16 about which the clamping device 7 is pivotable taking the form of a foil-like or film-like hinge. Such a container can be manufactured very simply and inexpensively using conventional molding techniques.

What is claimed is:

1. A container for a record carrier assembly, comprising a receptacle for a record carrier assembly, a compartment for a graphic carrier, a wall separating said receptacle and said compartment, a clamping device arranged on said wall for clamping a graphic carrier in said compartment in a clamped position when said device is actuated, and means for moving said clamping device into an actuated position in response to insertion of a record carrier assembly into the receptacle, said means comprising a lug on the said clamping device projecting into said receptacle.

2. A container as claimed in claim 1, wherein the said wall has a cut-out in which the clamping device is disposed, said device being pivotable about a hinge extending in the plane of the wall.

* * * * *